United States Patent
Clery, III

Patent Number: 6,079,008
Date of Patent: Jun. 20, 2000

[54] MULTIPLE THREAD MULTIPLE DATA PREDICTIVE CODED PARALLEL PROCESSING SYSTEM AND METHOD

[75] Inventor: William B. Clery, III, Rockville, Md.

[73] Assignee: Patton Electronics Co., Gaithersburg, Md.

[21] Appl. No.: 09/054,392

[22] Filed: Apr. 3, 1998

Related U.S. Application Data

[60] Provisional application No. 60/053,975, Apr. 4, 1997.

[51] Int. Cl.[7] .................................................. G06F 15/00
[52] U.S. Cl. ........................... 712/11; 712/20; 712/16; 712/43; 712/13
[58] Field of Search .................. 712/22, 21, 11, 712/14, 16, 205, 229, 241, 20, 43

[56] References Cited

U.S. PATENT DOCUMENTS

| | | | |
|---|---|---|---|
| 4,380,046 | 4/1983 | Fung | 712/22 |
| 4,435,758 | 3/1984 | Lorie et al. | 712/22 |
| 4,591,981 | 5/1986 | Kassabov | 712/22 |
| 4,775,952 | 10/1988 | Danielsson et al. | 708/524 |
| 4,907,148 | 3/1990 | Morton | 712/22 |
| 4,992,933 | 2/1991 | Taylor | 712/22 |
| 5,038,282 | 8/1991 | Gilbert et al. | 712/14 |
| 5,045,995 | 9/1991 | Levinthal et al. | 712/236 |
| 5,212,777 | 5/1993 | Gove et al. | 712/229 |
| 5,418,915 | 5/1995 | Matuda et al. | 712/22 |
| 5,430,854 | 7/1995 | Sprague et al. | 712/236 |
| 5,522,080 | 5/1996 | Harney | 710/220 |
| 5,542,074 | 7/1996 | Kim et al. | 712/22 |
| 5,555,428 | 9/1996 | Radigan et al. | 712/22 |
| 5,574,939 | 11/1996 | Keckler et al. | 712/24 |
| 5,581,778 | 12/1996 | Chin et al. | 712/1 X |
| 5,765,037 | 6/1998 | Morrison et al. | 713/502 |
| 5,822,608 | 10/1998 | Dieffenderfer et al. | 712/20 |
| 5,903,771 | 5/1999 | Sgro et al. | 712/20 |
| 5,941,983 | 8/1999 | Gupta et al. | 712/214 |
| 5,968,167 | 10/1999 | Whittaker et al. | 712/225 |

Primary Examiner—Larry D. Donaghue

[57] ABSTRACT

A parallel processing system or processor has a computing architecture including a plurality of execution units to repeatedly distribute instruction streams within the processor via corresponding buses, and a series of processing units to access the buses and selectively execute the distributed instruction streams. The execution units each retrieve an instruction stream from an associated memory and place the instruction stream on a corresponding bus, while the processing units individually may select and execute any instruction stream placed on the corresponding buses. The processing units autonomously execute conditional instructions (e.g., IF/ENDIF instructions, conditional looping instructions, etc.), whereby an enable flag within the processing unit is utilized to indicate occurrence of conditions specified within a conditional instruction and control selective execution of instructions in response to occurrence of those conditions. An enable stack is utilized to facilitate processing and execution of nested conditional instructions by storing the states of the enable flag for each nested conditional instruction. The parallel processor may further delay placement of selected instruction streams onto corresponding buses until each processing unit selecting a particular instruction stream enters a state to execute that instruction stream. In addition, each execution unit may cease placing an instruction stream onto a corresponding bus in response to no processing units selecting that instruction stream for execution.

12 Claims, 6 Drawing Sheets

MULTIPLE THREAD MULTIPLE DATA PREDICTIVE CODED PARALLEL PROCESSING SYSTEM AND METHOD

CROSS-REFERENCE TO RELATED APPLICATIONS

This application claims priority from U.S. Provisional Patent Application Ser. No. 60/053,975, entitled "Multiple Thread Multiple Data Predictive Coded Parallel Processor (MTMD)", filed Apr. 4, 1997. The disclosure of that provisional patent application is incorporated herein by reference in its entirety.

BACKGROUND OF THE INVENTION

1. Technical Field

The present invention pertains to a processing system or processor including a computing architecture capable of performing a limited number of individual threads (i.e., instruction streams) on an unlimited number of data streams. This architecture is preferably suited for systems where a great deal of symmetry exists between the data streams and the algorithms processing them, but in which each data stream is a distinct entity.

The design of a Multiple Thread Multiple Data (MTMD) processor according to the present invention includes both a hardware architecture and a software technique, both of which are described below. In addition, the software design methodology needed to efficiently use the MTMD processor is also described below.

2. Discussion of Related Art

There are many data processing applications wherein multiple streams of data may be processed with the same sequence of instructions. In view of these applications, the development of the Single Instruction Multiple Data (SIMD) architecture has progressed to the Multiple SIMD (MSIMD) and Multiple Instruction Multiple Data (MIMD) architectures. The applications for these architectures typically include weather and other system simulations, video and image processing. The goal of these architectures is to solve a single problem that involves large and sometimes multiple vector operations. As such, the current state of the SIMD architecture is based on one or more instruction streams that control and centrally allocate a pool of data processors. These data processors individually perform a relatively small portion of the overall application and are interconnected through a matrix or common data memory structure.

The MTMD processor of the present invention incorporates multiple unique circuits into the basic MSIMD architecture to create a machine that is better suited for performing many individual small tasks having some instruction commonality. These individual tasks each have an individual execution life and may transition through various phases of the total algorithm during that execution life. For example, there may be 1000 data streams with seven algorithm phases, thereby enabling application of a large amount of commonality. Since the phase transitions of a data stream are based solely on that data stream, the individual data processing elements cannot be under the control of the instruction stream or a central control unit, but rather, must have control over themselves.

This new improved architecture is referred to herein as the Multiple Thread Multiple Data (MTMD) architecture whereby the term "thread" physically refers to an instruction stream or, with respect to the MTMD architecture, a repeated circular software thread (e.g., a repeating set of instructions). Each data stream has the ability to select a thread that repeatedly processes the data stream (e.g., the thread instructions are executed repeatedly) whereby the data stream selectively executes instructions of the selected thread.

Data and voice communications networks utilize many applications that are suited to the MTMD architecture. Some examples of such applications include:

Echo cancellation in the Public Switched Telephone Network (PSTN)

Global System for Mobile Communication or Groupe Special Mobile (GSM) speech compression in the cellular telephone network Primary Rate Integrated Services Digital Network (ISDN) V.120 negotiations and compression Analog Modem V.8, V.34 and others Central cite encryption Ethernet packet switching Applying the MTMD architecture to a public network incurs a new set of restrictions on size and power of the implementing circuit, thereby enabling incorporation of additional features to reduce power consumption. Typically, the SIMD architecture is utilized in supercomputers, high end video workstations and medical imaging where size, power and cost may not be primary concerns.

OBJECTS AND SUMMARY OF THE INVENTION

Accordingly, it is an object of the present invention to process large quantities of data with a high degree of parallelism via a parallel processor including a computing architecture wherein execution units repeatedly broadcast instruction streams to processing units that individually may select and execute any instruction stream or designated portion thereof broadcasted by the execution units.

It is another object of the present invention to enable a processing unit of a parallel processor to autonomously execute conditional instructions of an instruction stream via inline opcodes (e.g., opcodes contained within the instruction stream), whereby instructions dependent upon occurrence of conditions indicated within a conditional instruction (e.g., instructions contained within a conditional instruction block) are selectively executed in response to a flag that is set to a state in accordance with occurrence of those conditions. Further, execution of nested conditional instructions may be accomplished via a stack that stores the states of the flag for each nested conditional instruction, whereby instructions dependent upon conditions indicated within a nested conditional instruction (e.g., instructions contained within a nested conditional instruction block) are selectively executed based on the state of the flag stored in the stack for that nested conditional instruction.

Yet another object of the present invention is to execute conditional looping instructions of an instruction stream within a processing unit of a parallel processor by setting a flag to a particular state to terminate execution of a loop in response to occurrence of conditions indicated within a conditional looping instruction, whereby each processing unit of the processor may execute a different quantity of loop iterations during execution of an instruction stream based on the occurrence of those conditions within that processing unit.

Still another object of the present invention is to reduce idle time within particular processing units of a parallel processor resulting from those processing units waiting for processor execution units to broadcast appropriate portions of selected instruction streams (e.g., processing units waiting for execution units to complete current broadcasts of instruction streams and initiate new instruction stream broadcasts each starting with the first instruction of a respective instruction stream) by enabling processing units to control execution units to delay broadcasts of selected instruction streams until each processing unit selecting a particular instruction stream enters a state to execute that instruction stream.

A further object of the present invention is to reduce power consumption of a parallel processor by controlling each processor execution unit to cease broadcasting a particular instruction stream when no processing units of the processor have selected that instruction stream for execution.

The aforesaid objects may be achieved individually and in combination, and it is not intended that the present invention be construed as requiring two or more of the objects to be combined unless expressly required by the claims attached hereto.

According to the present invention, a parallel processor has a computing architecture including a plurality of execution units to repeatedly distribute instruction streams within the processor via corresponding buses, and a series of processing units to access the buses and selectively execute the distributed instruction streams. The execution units each retrieve an instruction stream in accordance with the control flow of the instruction stream (e.g., in the execution order of the instructions) from a cache associated with that execution unit, the cache containing a portion of a corresponding code memory storing the instruction stream. An address within the code memory associated with a next or succeeding instruction of the instruction stream is determined within each execution unit to request that next instruction from the associated cache. If the next instruction does not reside within the associated cache, the next instruction is retrieved from the corresponding code memory and placed within the associated cache. The execution units may determine the next instruction address in accordance with various instructions producing non-sequential or branching control flow (e.g., LOOP, BRANCH and CALL instructions) and nested instructions (e.g., nested LOOP or CALL instructions) to enable retrieval of the instruction streams from the associated caches (e.g., via the corresponding code memories) in the proper control flow sequence.

The execution units retrieve respective instruction streams from the associated caches as described above and place the instruction streams onto corresponding buses that are accessible to each processing unit. The instruction streams may be partitioned into designated portions (e.g., via a SYNCH instruction that identifies locations within the instruction stream where execution may begin) such that the designated portions may be selected for execution. The processing units individually may select any instruction stream or designated portion thereof placed on the buses by the execution units. The selected instruction streams are retrieved from the appropriate buses and executed within the respective processing units. The processing units autonomously execute conditional instructions (e.g., IF/ENDIF instructions, conditional looping instructions, etc.) within the instruction streams via inline opcodes (e.g., opcodes contained within the instruction stream), whereby each processing unit includes an enable flag that is set to a state in accordance with occurrence of conditions indicated within a conditional instruction. Instructions dependent upon the conditions indicated within the conditional instruction (e.g., instructions contained within a conditional instruction block) are selectively executed based on the state of the enable flag. Further, the enable flag may be utilized to terminate execution of a loop in response to occurrence of conditions indicated within a conditional looping instruction. This enables each processing unit of the processor to execute a different quantity of loop iterations during execution of an instruction stream based on the occurrence of those conditions within that processing unit. In addition, an enable stack is utilized by each processing unit to facilitate processing and execution of nested instructions (e.g., nested IF instructions, nested conditional loop instructions, nested IF and conditional loop instructions, etc.). The enable stack stores the state of the enable flag for each nested instruction whereby the stored enable flag states control selective execution of instructions associated with each nested instruction (e.g., instructions contained within a nested conditional instruction block) in substantially the same manner described above.

The parallel processor may further reduce idle time of particular processing units by enabling those processing units to control distribution of selected instruction streams. In particular, processing units of the processor may transmit signals to processor execution units to delay placement of selected instruction streams onto corresponding buses until each processing unit selecting a particular instruction stream enters a state to execute that instruction stream. The idle time of particular processing units is reduced since the execution units initiate distribution of a particular instruction stream as soon as processing units selecting the particular instruction stream become available to execute that instruction stream. In addition, each execution unit may cease placing an instruction stream onto a corresponding bus in response to signals received from processing units indicating that no processing units have selected that instruction stream for execution, thereby reducing power consumption of the parallel processor.

The above and still further objects, features and advantages of the present invention will become apparent upon consideration of the following detailed description of specific embodiments thereof, particularly when taken in conjunction with the accompanying drawings wherein like reference numerals in the various figures are utilized to designate like components.

DESCRIPTION OF THE PREFERRED EMBODIMENTS

Figure 1:
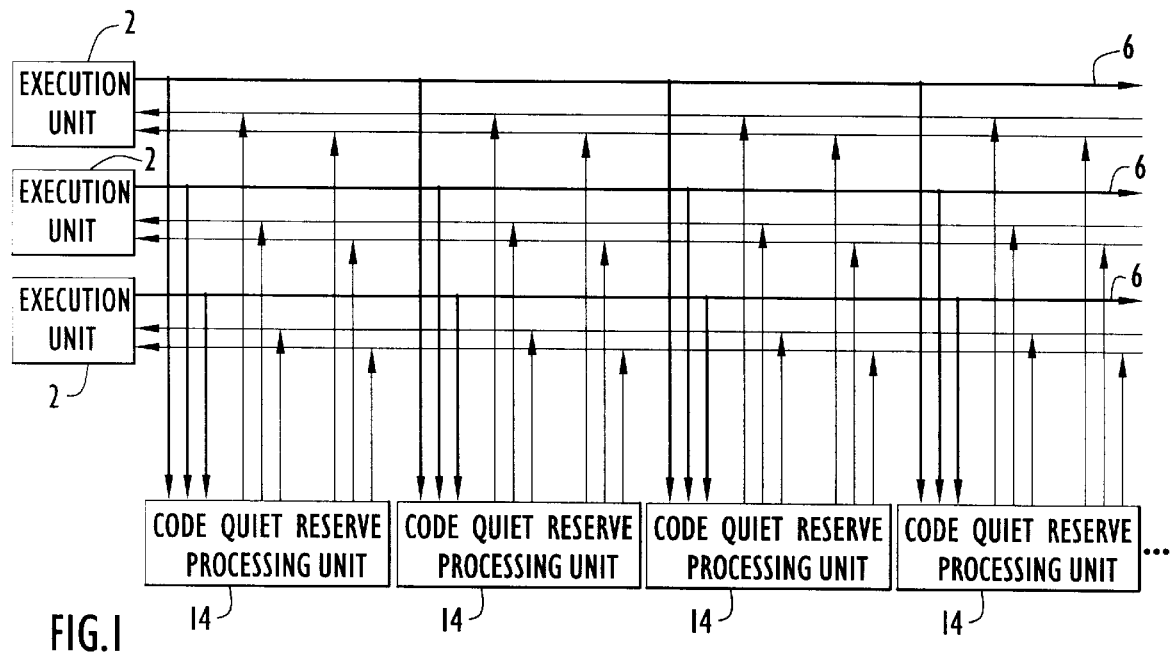
FIG. 1 is a schematic block diagram of an exemplary MTMD processor according to the present invention.

The following terms are used herein throughout the architecture description to generally refer to architecture components.

Execution Unit (EU)

A group functional block including a code memory, a bus interface unit, a cache, a next address generator, a branch instruction decoder and sequence control logic. The execution unit performs the function of broadcasting a stream of opcodes that represent an individual thread.

Code Memory

A large read only memory accessible by and dedicated to an individual execution unit. This memory is utilized to store opcodes that represent an individual thread.

Bus Interface Unit

A synchronous logic device that reads instructions from the code memory and places the instructions into a cache. Sequence control logic in combination with a next address generator request from the cache an instruction residing at a particular address within the code memory. If the requested instruction is not currently stored in the cache, the bus interface unit acquires the use of an external bus via arbitration, provides the next address to the code memory, retrieves the desired instruction from the code memory and places the retrieved instruction in the cache. The bus interface unit in combination with the cache provide a manner in which to efficiently retrieve large bursts (e.g., up to 8,192 bits) of code from the code memory whereby the large bursts of code are subsequently extracted from the cache as small instructions (e.g., eight to sixteen bits). If any delay is incurred while acquiring the next opcode, a no operation (NOP) instruction may be broadcast to any listening processing units.

Cache

A very high speed memory residing on the silicon with a next address generator and sequence control logic. The cache maintains an internal copy of a portion of the external code memory whereby that portion of the code memory maintained within the cache changes dynamically to best support the requirements of the next address generator.

Current Address

A register containing an address within the address space of the code memory indicating a location where a current instruction being processed resides.

The current address is updated by a next address generator each clock cycle.

Next Address Generator

A device for calculating an address within the address space of the code memory where a subsequent instruction within a thread resides. The determination of a next address is based on a current address, an instruction being executed and states of a call stack and a loop stack. The next address generator determines the source to utilize to generate the next address. This determination is made in accordance with input from sequence control logic based on execution of branching type instructions, such as BRANCH, LOOP, CALL and RET (i.e., return).

Call Stack

A memory device for saving a return address for utilization at the completion of execution of a subroutine call. When a CALL instruction is executed, an address of an instruction subsequent to the CALL instruction is pushed (i.e., placed) onto the call stack. When a RET (i.e., return) instruction is executed, the call stack is popped (i.e., data is retrieved from the stack) and execution continues at the address retrieved from the call stack. The depth of the call stack determines the quantity of CALL/RET instructions that can be nested.

Loop Stack

A memory device for saving parameters associated with implementing LOOP instructions. These parameters include Top-of-Loop, Bottom-of-Loop and Loop-Count. When a new loop is entered, these parameters are pushed (i.e., placed) onto the loop stack. As further loops are nested, their parameters are pushed onto the loop stack. When a loop is exited, its parameters are popped (i.e., retrieved) from the loop stack, thus enabling an immediate outer loop to resume execution.

Sequence Control Logic

Logic in the execution unit that determines an appropriate action in response to a currently executing instruction. The sequence control logic provides the next address generator with control signals that indicate the manner in which to calculate a next address. The sequence control logic further indicates to a bypass multiplexer the appropriate time to enable broadcast of a no operation (NOP) instruction. Moreover, the sequence control logic monitors a quiet signal and a reservation signal for enabling the execution unit to respectively enter a sleep mode and delay thread execution as described below. In addition, the sequence control logic enables addressing of the code memory in order to select the next opcode for broadcasting, and evaluates BRANCH, CALL, RET (i.e., return), LOOP and SYNC instructions to modify an instruction address designating a subsequent instruction within the code memory to implement a branch redirection (e.g., these instructions generally require branching to addresses within the code memory, thereby affecting sequential retrieval of instructions).

Bypass Multiplexer

A device for overriding an instruction stream with NOP instructions for broadcast to processing units.

Branch Instruction Decoder

A device for decoding instructions specifically to determine whether or not an instruction is a branch type instruction and, if so, identifying that instruction. This information is utilized by the sequence control logic to determine appropriate execution unit actions.

Branch Address

A register maintaining a destination address of a branch instruction within an address space of the code memory whereby the destination address indicates a location where a next instruction resides. This address is utilized by the next address generator to calculate an address for an instruction subsequent to a branch type instruction (e.g., BRANCH, CALL, RET (i.e., return), LOOP).

Processing Unit (PU)

A group functional block including an arithmetic logic unit (ALU), an enable stack, an enable flag, a local data memory, data input/output, a thread selection block (TSB), a register bank, and an opcode delay pipe.

Current Thread Hold

A register that receives information from the processing unit and maintains an index number of a thread executed by that processing unit. The index number is typically a binary representation of threads 0 to N-1(e.g., N being the total quantity of threads within an MTMD system).

Thread Demuliplexer

A device that performs a conventional demultiplexing function whereby the device receives the binary representation of an index number maintained in the current thread hold register and produces an individual signal correlated to each thread with only one signal being active at a time. The output of this device is driven through open drain buffers and is directly connected to similar outputs of other processing units to generate a wired-OR signal that is fed into a quiet signal input of the execution unit.

Reservation Hold

A register that receives information from the processing unit and maintains a bit mask indicating particular threads the processing unit selects for reception of a "reservation". The output of this register is driven through open drain buffers and is directly connected to similar outputs of other processing units to generate a wired-OR signal that is fed into a reservation signal input of the execution unit. The contents of the reservation hold register are automatically cleared when the current thread hold register receives information.

Opcode Delay Pipe

A first-in-first-out (FIFO) synchronous memory device that is configured to a specific length. The length of the delay pipe is configured to be unique for each processing unit sharing an external I/O access device. When an opcode that forces an access to external I/O (e.g., external bulk memory) is broadcast, the individual processing units execute that opcode at different clock positions, thus simplifying arbitration of the external I/O device (e.g., external bulk memory).

Enable Flag

A single bit register that indicates an active state of an ALU of the processing unit. The output of the enable flag controls the function of an enable multiplexer. When the enable flag is set, the enable multiplexer is configured to pass opcodes to the ALU, thereby enabling the processing unit to enter an active state. When the enable flag is clear, the enable multiplexer is configured to pass a continuous stream of NOP opcodes to the ALU, thereby disabling the processing unit and causing the processing unit to enter an inactive state. When the processing unit enters an inactive state, the enable flag causes the processing unit to ignore the opcode thread except for IF/ENDIF and LOOP/ENDLOOP opcodes that are used to modify the enable flag and enable stack.

Enable Stack

A first-in-last-out or last-in-first-out (LIFO) memory device having sufficient capacity to store N one-bit entries whereby the enable stack stores the state of the enable flag through a nesting of up to a total of N IF/ENDIF and conditional looping (e.g., variable terminated looping, conditional terminated looping and conditional LOOP BREAK described below) instruction blocks. A current state of the enable flag is pushed (i.e., placed) onto and popped (i.e., retrieved) from the enable stack in response to control signals generated by enable logic.

Enable Logic

A logic device that determines a next state of the enable flag based on an opcode available on an opcode bus. The enable logic also receives input in the form of ALU status flags, thus allowing conditional execution based on results of previous arithmetic computations. The enable logic tracks nesting of IF/ENDIF and conditional looping instruction blocks and controls pushing and popping of data onto and from the enable stack in accordance with the IF/ENDIF and conditional looping instruction block nesting.

Decode of Conditionals

A device for decoding instructions specifically to determine whether or not an instruction is a block conditional type instruction and, if so, identifying that instruction. Block conditional instructions are defined to be those opcodes that may change the state of the enable flag.

Instruction Decoder

A device for converting opcodes into control signals (e.g., output enables, clock enable and gates) that are fed to components of the processing unit, and in particular, the ALU and register bank.

Arithmetic Logic Unit (ALU)

A functional block that performs mathematical operations on data. Input operands may be received from a register bank or immediate data contained within the instruction stream, while output results are written to the register bank. The mathematical functions may include addition, subtraction, multiplication, division, multiply-and-accumulate, and trigonometric functions, whereby the particular mathematical function performed by the ALU is controlled by the instruction decoder.

Register Bank

A limited number of directly addressable registers that may transfer data to the ALU or a local data memory, and receive information from the local data memory or the output of the ALU. The registers are capable of receiving a new value from the local data memory, while a current value is being processed by the ALU.

Local Data Memory

A relatively small memory used to maintain input and output data of calculations performed by the processing unit. Each processing unit is provided with a separately accessible memory space.

DMA Control Logic

A device for synchronizing access from external devices (e.g., serial port, host CPU, external memory) into the local data memory of the processing unit. Each processing unit provides an indication as to whether or not its local data memory is accessed by the register bank in the upcoming clock cycle. If the local data memory is not accessed by the register bank and an external device has a pending request into that local data memory, the DMA control logic performs the local data memory access (e.g., "while the register bank is not looking").

Thread Selection Block

A multiplexing block that allows the processing unit to select a particular broadcasted opcode stream to execute.

External Bulk Memory

A large memory shared by a limited fixed number of processing units. This memory is used by algorithms for storage of less critical infrequently accessed data. Access to this memory is more costly since it must be arbitrated between processing units.

The MTMD architecture is an improvement upon the Multiple Single Instruction Multiple Data (MSIMD) computer architecture. Specifically, the MSIMD architecture has been improved to provide a processing system preferably suited to the application of data communications. The following are improvements to the base MSIMD architecture:

Conditional execution of instructions via the use of an enable flag and enable stack described above with the modification that conditional execution of instructions is implemented with inline opcodes rather than an additional bus carrying status instructions.

Conditional looping instructions (e.g., variable terminated looping, conditional terminated looping, conditional LOOP BREAK, etc.) via deactivation of the enable flag during execution of a loop (e.g., during loop counting) and reactivation of the enable flag in response to an ENDLOOP opcode.

Individual selection of an execution unit by each processing unit via the thread select block allowing each processing unit to individually transition through different phases of a multi-phase algorithm, whereby each execution unit provides one or more phases of the total algorithm.

Synchronization system using an opcode that identifies the "top" of the thread. The "top" of the thread is referred to herein as a location where a processing unit that has recently selected a thread may safely begin execution of that thread (e.g., the location of the first instruction within a thread).

Global reservation system that allows any individual processing unit to maintain an execution unit at the top of a thread until that individual processing unit is ready to proceed executing that thread.

Global quiet system that prevents an individual execution unit from broadcasting opcodes when no processing units are executing a thread of that individual execution unit.

An exemplary MTMD processor is illustrated in FIG. 1. Specifically, an MTMD processor includes execution units 2, opcode buses 6 and processing units 14. The exemplary MTMD processor includes three execution units, three processing units and three opcode buses, however, the MTMD processor may include any number (e.g., at least one) of execution units, opcode buses and processing units to accommodate a particular application. Each execution unit 2 repeatedly broadcasts instructions from a single thread or instruction stream to each processing unit 14 via opcode buses 6. The execution units 2 each typically contain a unique thread corresponding to different phases of an algorithm whereby processing units 14 are connected to each opcode bus 6 and select a particular thread to execute. Each processing unit 14 sends a quiet signal to each execution unit 2 and, when no processing units 14 are executing a particular thread, the execution unit 2 broadcasting that thread enters a sleep mode as described below until a processing unit 14 desires to execute that thread. In addition, an individual processing unit 14 may prevent an execution unit 2 from broadcasting opcodes of a thread until that processing unit completes execution of its current thread. This is accomplished by placing a reservation with the desired thread, or in other words, sending a reservation signal to the execution unit containing the desired thread as described below. Thus, each processing unit autonomously selects a particular thread (e.g., phase of an algorithm) to execute in order to process in parallel large quantities of data according to an overall algorithm. This particular architecture enables high parallelism since numerous processing units may be connected to various opcode buses. It is to be understood that the various individual components of the MTMD processor are conventional or commercially available components known in the art and/or may be implemented in combinational logic or other circuitry by one of ordinary skill in the art based on the functional description of the various components described below.

Figure 2:
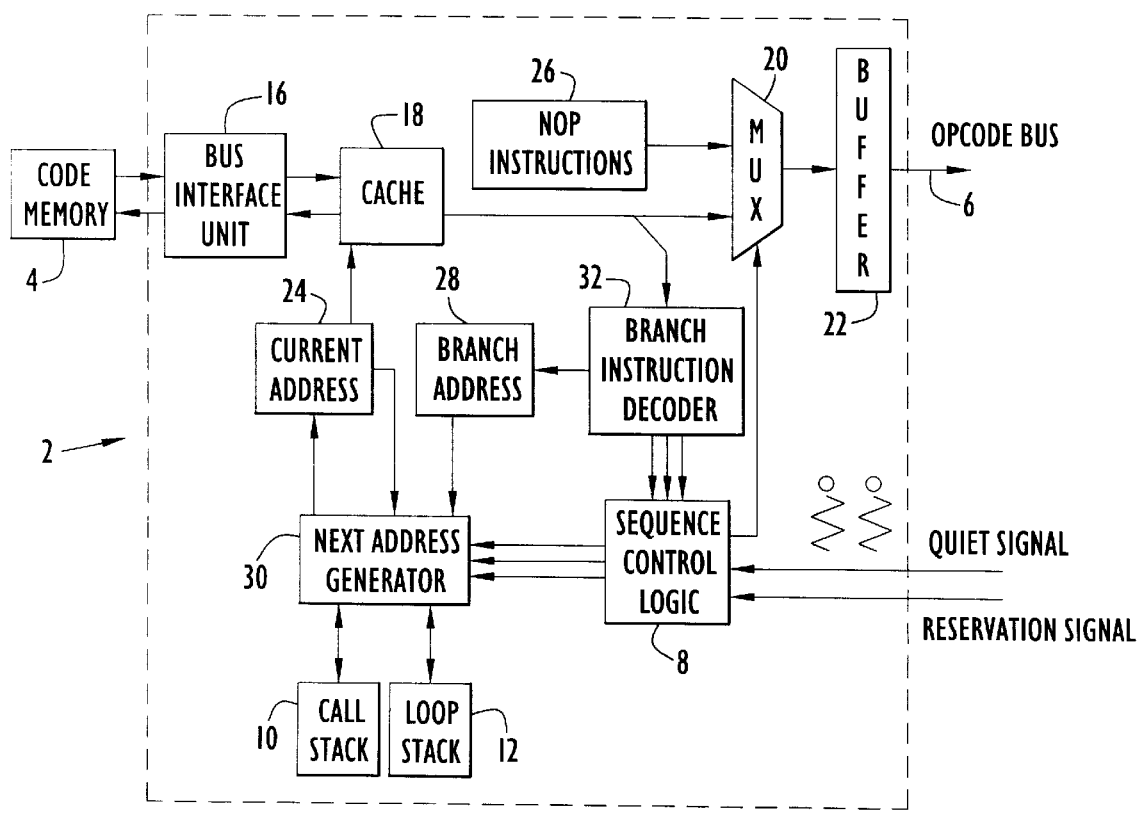
FIG. 2 is a schematic block diagram of an execution unit of the processor of FIG. 1 according to the present invention.

Referring to FIGS. 1–2, an execution unit 2 includes code memory 4, bus interface unit 16, cache 18, next address generator 30, branch instruction decoder 32, sequence control logic 8, call and loop stacks 10, 12, bypass multiplexer 20, buffer 22 and current and branch address registers 24, 28. Execution unit (EU) 2 sequences through code memory 4, typically disposed external of the execution unit, retrieving opcodes and broadcasting those opcodes on an opcode bus 6 via bypass multiplexer 20 and buffer 22. The code memory may be implemented by various memory devices, such as SRAM, DRAM, PROM, EPROM or Flash PROM, and may be co-located with sequence control logic 8 on the same silicon.

Bus interface unit 16 retrieves instructions from code memory 4 and places the instructions into cache 18. Cache 18 includes a high speed memory that maintains an internal copy of a portion of code memory 4 whereby that portion of the code memory maintained within the cache changes dynamically to support generation of an address for the next sequential instruction by next address generator 30. Sequence control logic 8 in combination with next address generator 30 request from cache 18 an instruction residing at a particular address within code memory 4. Next address generator 30 calculates a next address within code memory 4 containing a subsequent instruction within an executing thread. The address calculated by next address generator 30 is based upon a current address, the particular instruction being executed and the states of call stack 10 and loop stack 12. Next address generator 30 determines the source to utilize for generating the next address in accordance with input from sequence control logic 8 based on execution of a branching type instruction (e.g., BRANCH, LOOP, CALL and RET (i.e., return)), and places the address within current address register 24 each clock cycle.

When the requested instruction is not contained within cache 18, bus interface unit 16 acquires the use of an external bus via arbitration, provides the next address to code memory 4, retrieves the desired instruction from the code memory and places the retrieved instruction within cache 18. Bus interface unit 16 in combination with cache 18 essentially provide a manner in which to efficiently retrieve large bursts of code (e.g., up to 8,192 bits) from code memory 4 whereby the large bursts of code are subsequently extracted from cache 18 as small instructions (e.g., eight to sixteen bits). If any delay is incurred while acquiring the next opcode, a NOP (i.e., no operation) instruction 26 may be broadcast to processing units 14 executing that execution unit's thread. Sequence control logic 8 controls bypass multiplexer 20 to override the broadcasted instruction stream with NOP instruction 26 at appropriate times. Further, sequence control logic 8 controls execution unit 2 in response to quiet and reservation signals described above.

Sequence control logic 8 provides an address within code memory 4 as described above to sequentially increment through the code memory unless a branching opcode is encountered. The branching opcodes include CALL, RET (i.e., return), BRANCH and LOOP. Branch instruction decoder 32 receives an instruction from cache 18 and decodes the instruction specifically to determine whether or not the instruction is a branch type instruction and, if so, to identify the particular branch instruction. This information is sent to sequence control logic 8 to control execution unit 2 accordingly. Branch instruction decoder 32 retrieves the destination address of a branch instruction and places that address within branch address register 28. Next address generator 30 utilizes the branch address to calculate the next address within code memory 4 containing the instruction to be executed subsequent to a branch instruction.

Call stack 10, integral to the control logic, stores the return address of a function or subroutine call. When a CALL instruction is executed, the address of the instruction subsequent to the CALL instruction is placed (i.e., pushed) onto call stack 10. When a corresponding RET (i.e., return) instruction is executed, call stack 10 is popped (i.e., data is retrieved from the stack) and execution continues at the address retrieved from the call stack. The capacity of call stack 10 determines the quantity of CALL/RET instructions that may be nested. In other words, call stack 10 enables proper return from multiple nested CALL opcodes. A loop stack 12, also integral to the control logic, stores the top and bottom of a loop. In particular, loop stack 12 stores parameters associated with implementing LOOP instructions. These parameters include Top-of-Loop, Bottom-of-Loop and Loop-Count. When a new loop is entered, these parameters are pushed (i.e., placed) onto loop stack 12. As further loops are nested, their parameters are pushed (i.e., placed) onto loop stack 12. Upon completion of a loop, its parameters are popped (i.e., retrieved) from loop stack 12, thus enabling an immediate outer loop to resume execution. Thus, the loop stack enables loops to be nested within each other.

The sequence of opcodes that are broadcast from each execution unit 2 are cyclic, repeating each opcode within the sequence every cycle. This repeated cycle is referred to as a "thread". The first instruction in the thread is referred to as the Top of the Thread. A thread may include one or more phases of an overall algorithm that is to be implemented. A processing unit 14 that is executing a thread may use conditional opcodes to ignore specific phases within the thread. Code memory 4 is typically only accessed by an execution unit 2 whereby the code memory may be initialized at manufacturing time when implemented by a PROM, EPROM or Flash PROM. Code memory 4 may be dual ported or arbitrated and initialized by a host system. Thus, each execution unit 2 has no consciousness and absolutely no control over available processing units 14.

A typical MTMD system includes N execution units; N=1 being the trivial case, and N=3 being illustrated by way of example in FIG. 1 described above. This system includes N threads, individually identified as Thread A, Thread B, etc. Each thread is repeatedly broadcast from the top of the thread to the bottom of the thread, cyclically and uninterrupted whereby shorter threads have a higher frequency and repeat their cycle more frequently than longer threads. Execution units 2 operate asynchronously to each other, each reaching the top of their respective threads at different times. Since there are N opcode buses 6 in the system, each processing unit 14 includes a thread select block described below that attaches to any of the N opcode buses and thus enables execution of any of N threads by each processing unit.

Figure 3:
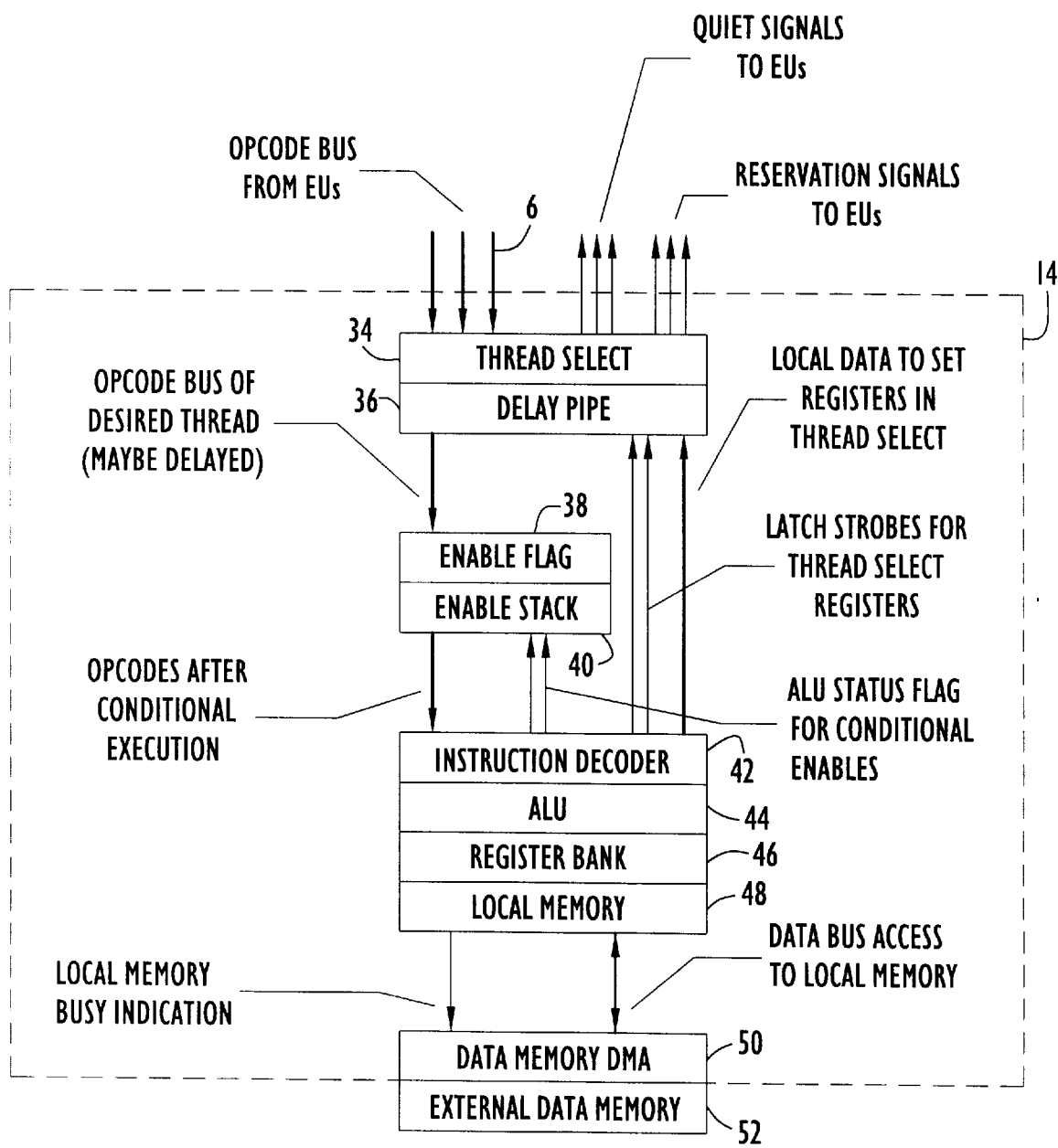
FIG. 3 is a schematic block diagram of a processing unit of the processor of FIG. 1 according to the present invention.

Referring to FIG. 3, each processing unit 14 includes thread selection block 34, opcode delay pipe 36, enable flag 38, enable stack 40, instruction decoder 42, arithmetic logic unit (ALU) 44, register bank 46, local memory 48, direct memory access controller 50 and external data memory and/or other input/output devices 52. Each processing unit (PU) 14 receives broadcasted opcodes for performing mathematical and/or movement operations on registers 46 or local data memory 48. Local data memory 48 must be individually allocated to processing unit 14 without any arbitration required between processing units. The local data memory may be implemented by various memory devices, such as SRAM or DRAM, and should be co-located on the silicon with ALU 44.

Figure 4:
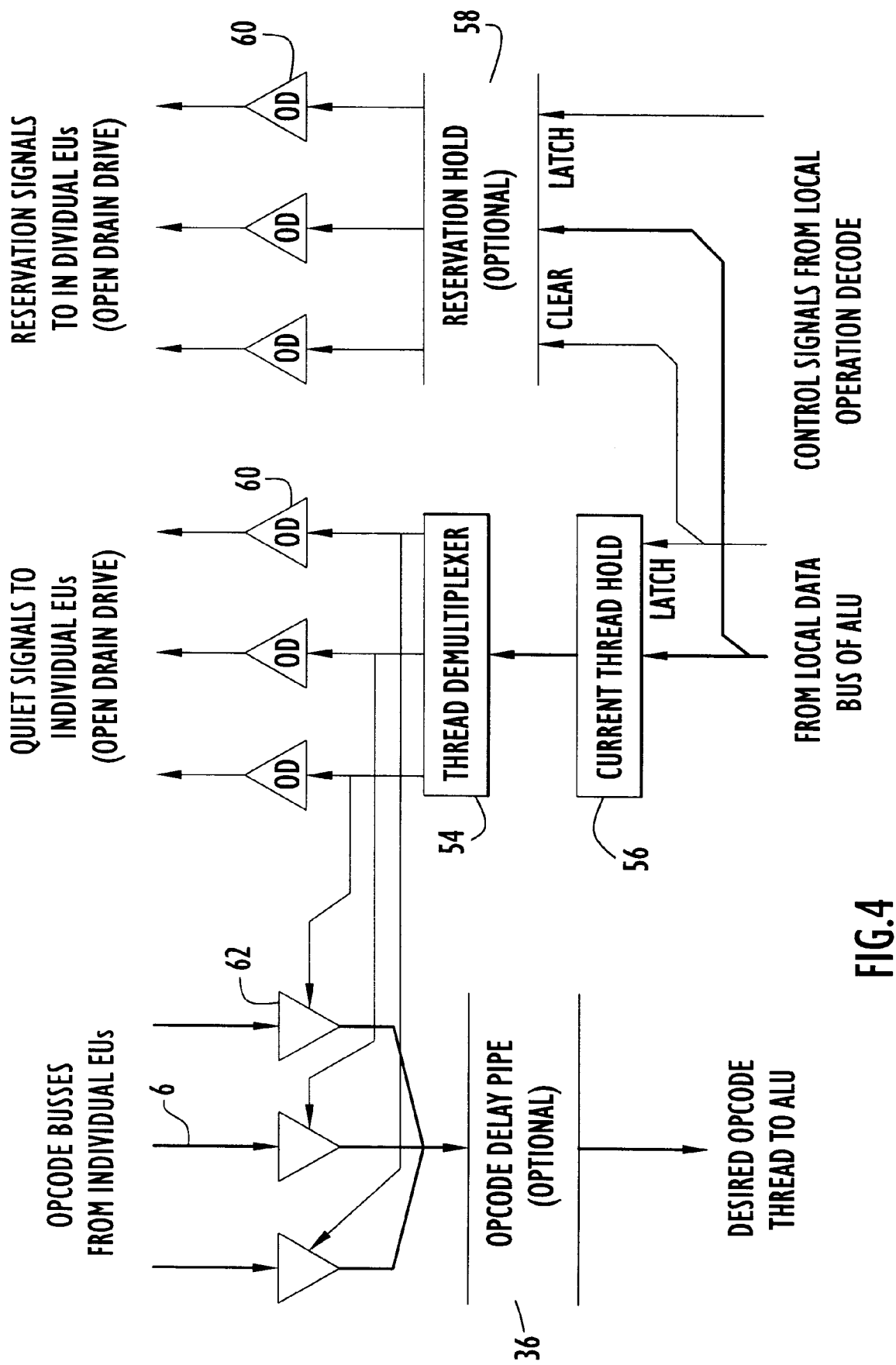
FIG. 4 is a schematic block diagram of a thread select block and opcode delay pipe of the processing unit of FIG. 3 according to the present invention.

A key element of each processing unit 14 is thread select block (TSB) 34 illustrated in FIG. 4. This block allows a processing unit 14 to establish an individual consciousness, moving through various phases of an algorithm without regard for a current state of other processing units 14 in the system. Thread select block 34 includes an N-to-1 multiplexer 62 that is disposed between N opcode buses 6 and ALU 44 of the processing unit. Multiplexer 62 passes opcodes from only one of N opcode buses 6 to ALU 44. Thread select block 34 further includes thread demultiplexer 54, current thread hold 56, reservation hold 58, and open drain buffers 60. Current thread hold 56 is a register that receives information from ALU 44 of processing unit 14 and maintains an index number of a thread executed by that processing unit. The index number is typically a binary representation of threads zero through N−1 (e.g., N being the total quantity of threads within an MTMD system). Thread demultiplexer 54 receives the thread index number from current hold thread 56 and produces an individual signal corresponding to each thread, whereby only one signal is active at a time. The output of thread demultiplexer 54 is driven through drain buffers 60 and is directly connected to similar outputs of other processing units 14 to generate a wired-OR signal that is fed into a quiet signal input of execution unit 2 described below. Reservation hold 58 is a register that receives information from ALU 44 of processing unit 14 in accordance with control signals derived from instruction decoder 42 (FIG. 3) when decoding an opcode, and maintains a bit mask indicating particular threads processing unit 14 selects for reception of a "reservation" (e.g., enabling delay of a thread until processing unit 14 is ready to execute that thread). The output of reservation hold register 58 is driven through open drain buffers 60 and is directly connected to similar outputs of other processing units 14 to generate a wired-OR signal that is fed into a reservation signal input of execution unit 2 as described below. The contents of reservation hold register 58 are automatically cleared when a thread index number is written into current thread hold register 56. Opcode delay pipe 36 is a first-in-first-out (FIFO) synchronous memory device that is configured to include a particular capacity (e.g., delay length) for storing opcodes received from multiplexer 62, whereby the delay (e.g., storage capacity of the opcode delay pipe that each opcode traverses) is configured to be unique for each processing unit 14 sharing an external I/O access device. When an opcode that forces an access to external I/O (e.g., external bulk memory) is broadcast, individual processing units 14 execute that opcode at different clock positions (e.g., based on varying opcode delay pipe lengths), thus simplifying arbitration of the external I/O device (e.g., external bulk memory).

At reset, thread select block 34 defaults to selection of Thread A (e.g., a first thread), however, a THREAD opcode described below may be executed at any time to control the thread select block and enable reception of opcodes from another opcode bus 6 (e.g., switch to another thread). Execution of the THREAD opcode may be contingent upon the state of enable flag 38 (e.g., similar to conditional execution of ALU opcodes). This allows THREAD opcodes to be placed within conditional execution IF/ENDIF instruction blocks, and enables multiple processing units 14 executing a common thread to perform individual unique thread transitions.

Figure 5:
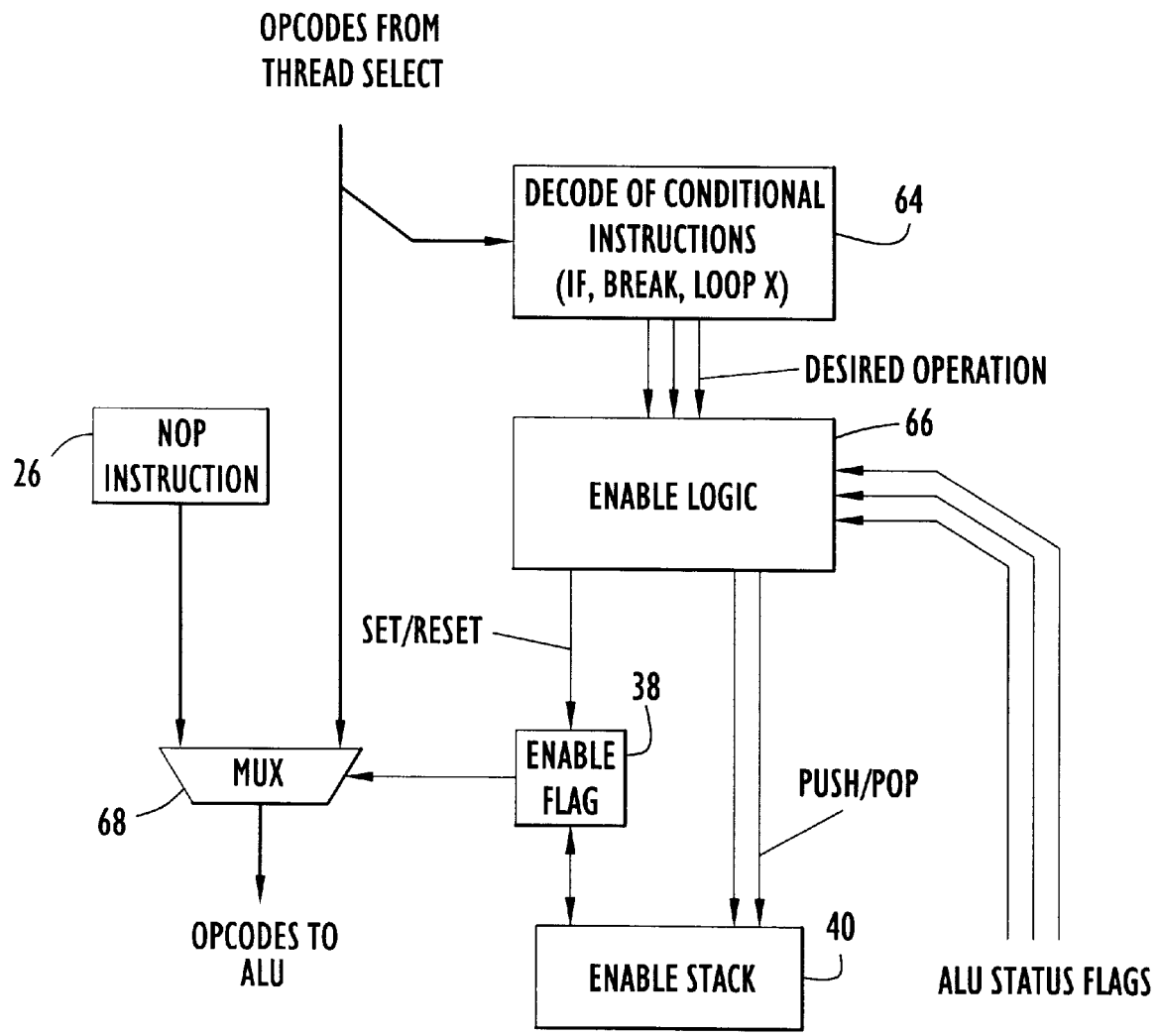
FIG. 5 is a schematic block diagram of an enable flag and enable stack of the processing unit of FIG. 3 in combination with logic for controlling activation of the processing unit according to the present invention.

The manner in which processing unit 14 utilizes enable flag 38 and enable stack 40 to selectively execute opcodes and generally implement conditional instructions (e.g., IF instructions, variable terminated looping, conditional looping, conditional LOOP BREAK, etc.) within a thread is now described with reference to FIG. 5. Specifically, enable flag 38 and enable stack 40 in combination with conditional instruction decoder 64, enable logic 66, and enable multiplexer 68 control operation of processing unit 14. Conditional instruction decoder 64 decodes instructions received via thread select block 34 (FIG. 3) specifically to determine whether or not an instruction is a block conditional type instruction (e.g., IF instruction, variable terminated looping, conditional terminated looping, conditional LOOP BREAK, etc.) and, if so, identifying that particular block conditional type instruction. Block conditional instructions are those opcodes that may change the state of enable flag 38. Enable logic 66 determines a next state of enable flag 38 based on information received from conditional decoder 64 subsequent to processing an opcode received via thread select block 34. Enable logic 66 further receives input in the form of status flags from ALU 44, thus allowing conditional execution based on the results of previous arithmetic computations. Enable logic 66 tracks nesting of IF/ENDIF and conditional looping (e.g., variable terminated looping, conditional terminated looping, conditional LOOP BREAK, etc.) instruction blocks and controls pushing (i.e., placing) and popping (i.e., retrieving) of data onto and from enable stack 40 in accordance with the IF/ENDIF and conditional looping instruction block nesting.

Enable flag 38 is a single bit register that indicates an active state of ALU 44, and includes an output that controls the function of an enable multiplexer 68. When enable flag 38 is set (e.g., when conditions indicated within a conditional instruction occur), enable multiplexer 68 is configured to pass opcodes received via thread select block 34 to ALU 44, thereby enabling processing unit 14 to enter an active state (e.g., execute instructions contained within the conditional instruction, such as instructions contained within IF statements and IF/ENDIF and conditional looping instruction blocks). When enable flag 38 is clear (e.g., when conditions indicated within a conditional instruction do not occur), enable multiplexer 68 is configured to pass a continuous stream of NOP (i.e., no operation) codes 26 to ALU 44, thereby disabling processing unit 14 and causing the processing unit to enter an inactive state (e.g., ignoring instructions contained within the conditional instruction, such as instructions contained within IF statements and IF/ENDIF and conditional looping instruction blocks). Enable stack 40 is a first-in-last-out, or last-in-first-out (LIFO) stack having a capacity to store N one-bit entries whereby the enable stack stores the state of enable flag 38 through a nesting of up to a total of N IF/ENDIF and conditional looping instruction blocks. The current state of enable flag 38 is pushed (i.e., placed) onto and popped (i.e., retrieved) from enable stack 40 in response to control signals generated by enable logic 66.

Figure 6:
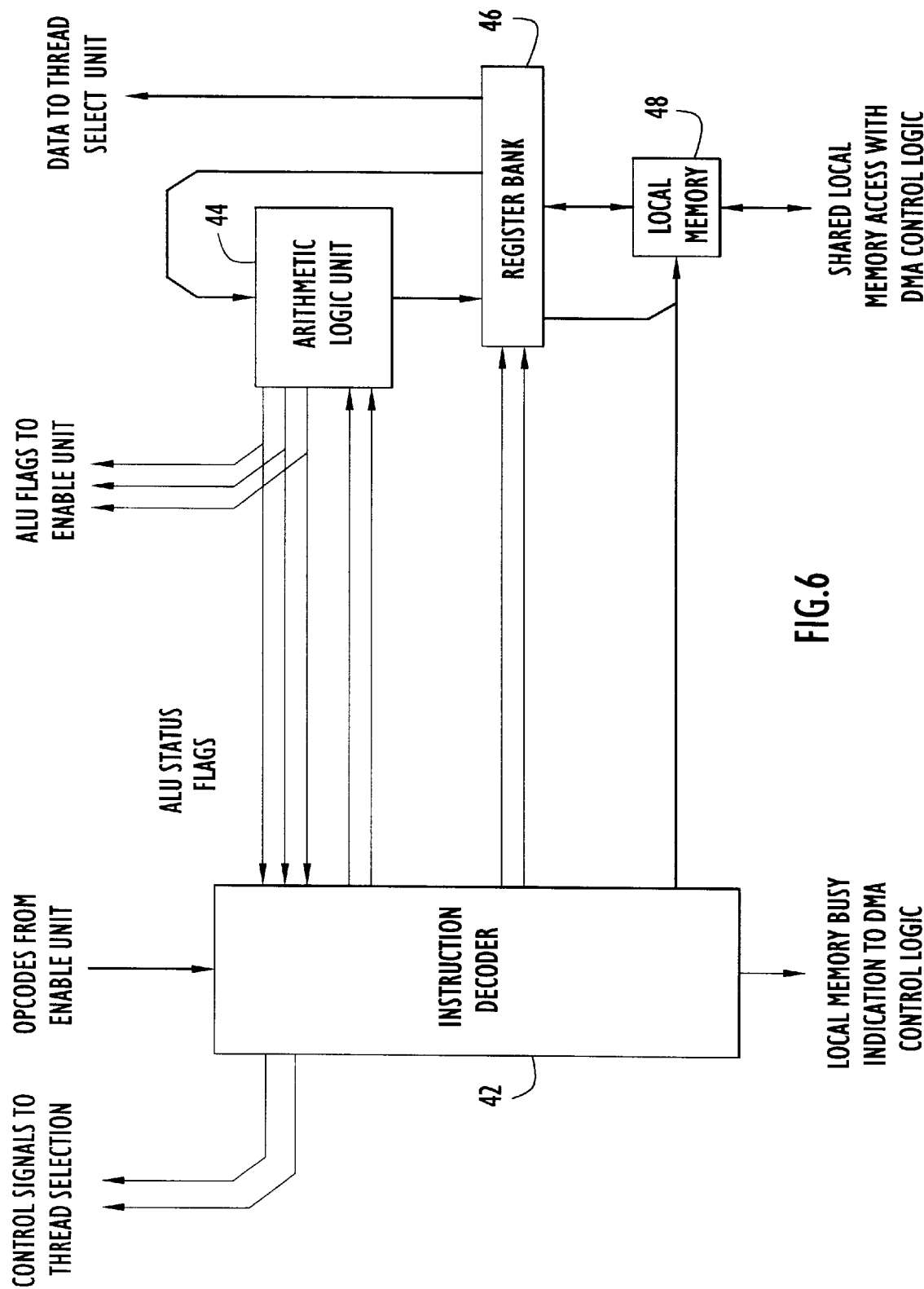
FIG. 6 is a schematic block diagram of interconnections between the instruction decoder, ALU, register bank and local memory of the processing unit of FIG. 3 for decoding and executing instructions within the processing unit according to the present invention.

The manner in which instructions are decoded and executed by a processing unit 14 is described with reference to FIG. 6. Specifically, instruction decoder 42, in its simplest form, is a demultiplexer that converts opcodes received from enable multiplexer 68 (FIG. 5) into ALU enable strobes. The opcodes are designed to be small in size to conserve code memory 4 (FIG. 2), reduce routing and conserve power, while the ALU enable strobes are required logic signals that enable sub-components of ALU 44 to perform various operations (such as send register X into the adder). Instruction decoder 42 further determines whether or not local memory 48 is to be accessed, and sends a signal to direct memory access controller 50 (FIG. 3) indicating the access status of that memory. Instruction decoder 42 converts opcodes into control signals (e.g., output enables, clock enables and gates) that are fed to various components of processing unit 14, especially ALU 44 and register bank 46, whereby the control signals enable these various components to perform functions designated by the decoded opcode. ALU 44 performs mathematical operations on data received from register bank 46 or immediate data (e.g., data supplied within instructions) from the instruction stream and generates ALU status flags indicating results of the mathematical operations for use by instruction decoder 42 and enable logic 66 (FIG. 5). The ALU mathematical functions may include addition, subtraction, multiplication, division, multiply-and-accumulate and trigonometric functions whereby the particular mathematical function performed by ALU 44 is controlled by instruction decoder 42. The output results of ALU 44 are written into register bank 46. Register bank 46 includes a limited number of directly addressable registers that may transfer data to ALU 44, local data memory 48 or thread select block 34 (FIG. 3) for selecting a particular thread. The registers may receive information from local memory 48 or the output of ALU 44, whereby the registers may receive a new value from local memory 48, while a current value is being processed by ALU 44. Local memory 48 includes a small memory used to maintain input and output data of calculations performed by processing unit 14 whereby each processing unit is provided with a separately accessible memory space.

Figure 7:
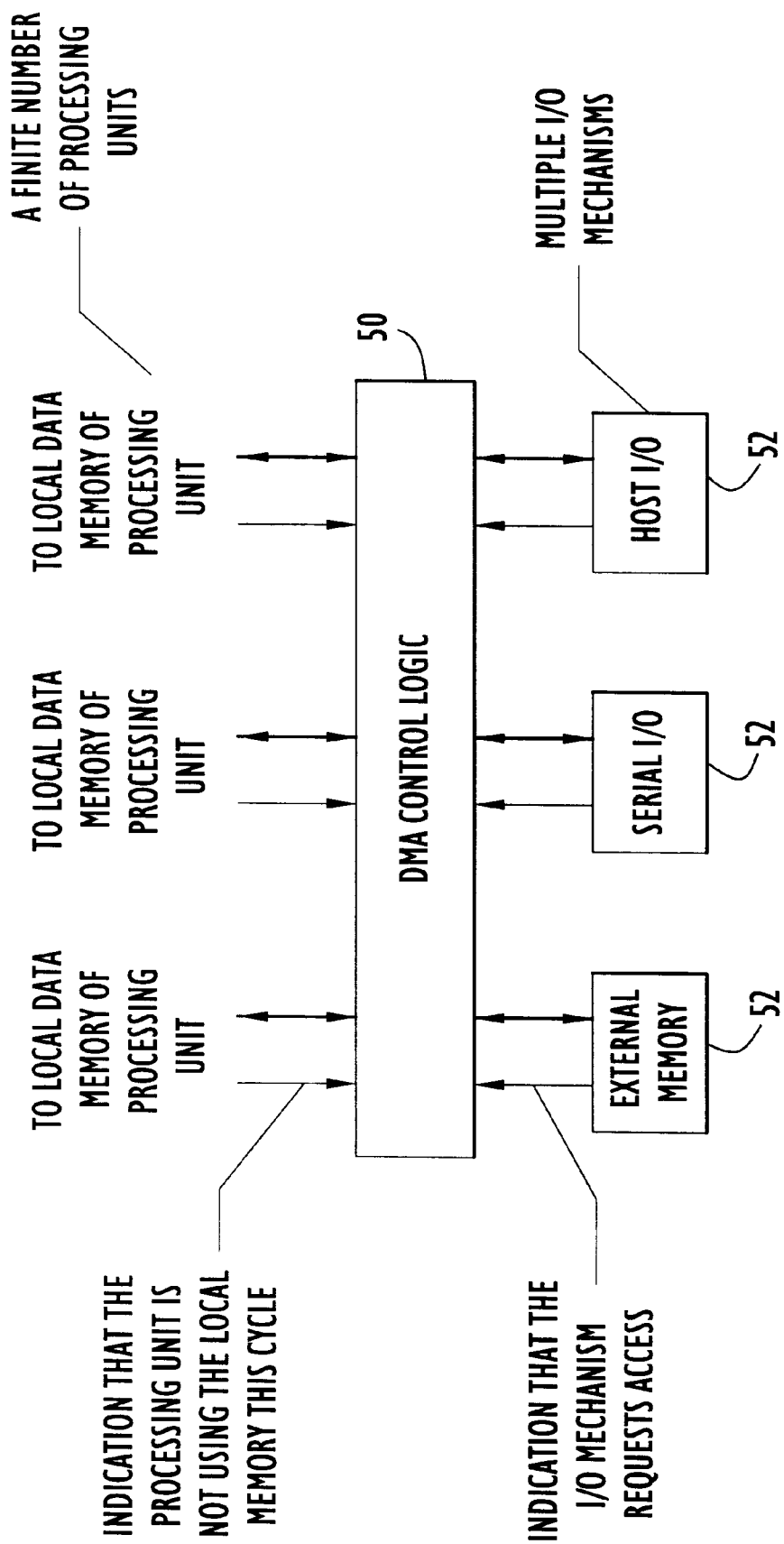
FIG. 7 is a schematic block diagram of a direct memory access controller of the processing unit of FIG. 3 and external devices interfacing the processing unit according to the present invention.

Each processing unit 14 may further access external I/O devices 52 as illustrated in FIG. 7. Specifically, direct memory access controller 50 synchronizes access from external devices 52 (e.g., serial port, host CPU, external memory) into local memory 48. Each processing unit 14 provides an indication as to whether or not its local memory 48 is accessed by register bank 46 in the upcoming clock cycle via instruction decoder 42 as described above. If local data memory 48 is not accessed by register bank 46 and an external device 52 has a pending request into that local memory 48, then direct memory access controller 50 performs the local data memory access (e.g., while register bank 46 "is not looking").

The function of instruction decoder 42 (FIG. 3) has been singled out because it may be disposed in various places within the MTMD processor depending upon the silicon implementation of the MTMD processor. The general rule is to dispose the instruction decoder function as close to execution unit 2 (FIG. 1) as possible without overburdening the routing resources. For example, instruction decoder 42 may be disposed in the following locations within an MTMD processor:

1) Instruction decoder 42 may be disposed between execution unit 2 and opcode bus 6. This effectively converts opcode bus 6 into an enable strobe bus, drastically increasing the number of signals carried in the bus. Each thread select block 34 must now multiplex the enable strobes (rather than opcodes). The advantage is that only one instruction decoder 42 is required per execution unit 2.

2) Instruction decoder 42 may be disposed between thread select block 34 and ALU 44 to enable each processing unit 14 to have its own instruction decoder 42. This reduces the number of signals on opcode bus 6 and thread select block 34.

3) If an individual integrated circuit (IC) contains only processing units and no execution units, instruction decoder 42 may be disposed at the entrance to the integrated circuit. This allows the printed circuit routing to handle only the opcodes, and combines the functionality (and power consumption) of instruction decoder 42 for all the processing units 14 on the integrated circuit.

Referring back to FIGS. 2–4, an optional reservation system may be incorporated into the MTMD architecture whereby the reservation system may be used to increase coding and parallel processing efficiency by temporarily halting an execution unit 2. Sequence control logic 8 within an execution unit 2 accepts an input designated the "reserve" signal. If sequence control logic 8 is currently enabling an execution unit 2 to broadcast a SYNC opcode (e.g., an opcode that indicates the top of a thread as described below) and the reserve signal is active, the sequence control logic effectively halts the execution unit and causes the execution unit to continue broadcasting the SYNC opcode until the reserve signal is inactive.

Thread select block 34 within each processing unit 14 provides a reserve output signal for each thread the block is capable of selecting. These output signals are open collector, driven low when thread select block 34 desires a reservation on a thread. A processing unit 14 indicates a reservation by executing a RESERVE opcode described below. The reserve output signals from processing units 14 are utilized to generate wired-OR signals corresponding to the threads of execution units 2 (e.g., a signal that is initially in a high state, typically via a resistor, whereby a wired-OR signal for a particular thread is driven to a low state when any reserve output signal from a processing unit 14 for the particular thread is driven low, and remains in a low state until all low reserve output signals from the processing units for the particular thread are removed, thereby permitting the wired-OR signal for the particular thread to return to a high state) that indicate when all processing units 14 remove their reservation from a particular thread, thereby enabling an execution unit 2 associated with the particular thread to broadcast that thread (e.g., a low wired-OR signal indicates the presence of a reservation for a thread, while a high wired-OR signal indicates that no reservations are present).

An example of the operation of the reservation system is described. Specifically, a processing unit 14 that is executing thread A may place a reservation on thread B and continue executing thread A. During the remaining execution of thread A, thread B has reached the top of its thread. Since thread B includes a pending reservation, thread B halts at the top of the thread and continually broadcasts SYNC opcodes. Eventually, thread A reaches a point where processing unit 14 transitions to thread B. Processing unit 14 selects thread B and immediately removes the reservation whereby the processing unit also receives the SYNC opcode from thread B and prepares itself to execute thread B. Execution unit 2 recognizes that the reservation is removed, and begins broadcasting thread B code. This example demonstrates the manner in which processing unit 14 operates more efficiently since thread B is available and ready to be broadcasted when processing unit 14 transitions to that thread.

Further, a plurality of processing units may each place a reservation on a common thread. For example, two processing units 14 executing threads A and C, respectively, may individually place a reservation on thread B. Thread B continues broadcasting until it reaches the top of its thread, and subsequently halts. The first processing unit 14 completes thread A, switches to thread B, removes its reservation and continually executes the SYNC opcodes broadcasted by thread B. Thread B still recognizes the reservation placed by the second processing unit 14 and remains halted (e.g., broadcasts the SYNC opcode). The second processing unit 14 eventually switches to thread B and releases its reservation. Thread B now recognizes that all reservations are removed and begins broadcasting its code. This example demonstrates the manner in which a small delay of the first processing unit can improve overall system efficiency since the second processing unit does not have to wait for a complete cycle broadcast of thread B.

Note that the reserve signal is not time critical due to the interlocking nature of the reservation system. The reserve signal may be considered an asynchronous signal that is sampled and synchronized at the entrance to execution unit 2. Implementation of this option does not restrict the possible large physical separation or heavy pipeline between execution unit 2 and processing unit 14 components.

With further reference to FIGS. 2–4, an optional quiet system may also be incorporated into the MTMD architecture whereby the quiet system reduces power consumption by allowing an execution unit 2 to "sleep", or in other words, enter a low power idle state when not in use. Sequence control logic 8 within an execution unit 2 receives an input designated the "quiet" signal. When the quiet signal is active, the entire execution unit 2 enters a sleep mode whereby the execution unit continually broadcasts the no operation (NOP) opcode on opcode bus 6. Once the sleep mode is entered, execution unit 2 resets to the top of a thread that is located at a known address in code memory 4, and places itself in a power reducing state until the quiet signal is removed. When the quiet signal is removed, execution unit 2 resumes execution at the top of the thread. The quiet signal is driven by thread select block 34 of every processing unit 14 whereby the thread select block selects between N threads, provides N quiet output signals with each quiet output signal corresponding to a different thread, and negates (e.g., sets to a low state) the quiet output signal of the thread that is currently executing. The quiet output signals of the processing units are utilized to generate wired-OR signals corresponding to threads or execution units 2 (e.g., a signal that is initially in a high state, typically via a resistor, whereby a wired-OR signal for a particular thread or execution unit is driven to a low state when any quiet output signal from a processing unit 14 for the particular thread is driven low, and remains in a low state until all quiet output signals from the processing units for the particular thread return to a high state, thereby permitting the wired-OR signal for the particular thread to return to a high state) that indicate when execution units 2 should enter a sleep mode (e.g., when no processing units are executing a thread of an execution unit). Thread select block 34 essentially allows threads that it does not select to be "quiet". If all thread select blocks 34 of processing units 14 allow a particular thread to be quiet, the execution unit broadcasting that thread receives a high wired-OR quiet signal (e.g., thread select blocks 34 of processing units 14 do not negate the quiet output signal corresponding to that thread) and sleeps until a processing unit 14 selects that thread indicated by a low wired-OR quiet signal (e.g., a quiet output signal for that thread from at least one of the processing units is driven low by a thread select block 34 to indicate execution of that thread and to produce a low wired-OR quiet signal).

Note that the quiet signal is not time critical due to the interlocking nature of the quiet system. The quiet signal may be considered an asynchronous signal that is sampled and synchronized at the entrance to execution unit 2. Implementation of this option does not restrict the possible large physical separation or heavy pipeline between execution unit 2 and processing unit 14 components.

An opcode definition for the MTMD architecture is described with reference to FIGS. 1–3. The opcode definitions described herein are not intended to limit the MTMD architecture to a specific bit coding scheme or an arithmetic register definition, but rather to provide an example of a total set of opcode types that can be supported by the MTMD architecture. An implementation of the MTMD architecture may provide instructions from all these categories or a subset of these categories.

A driving factor or goal in the implementation of an MTMD processor is to reduce the number of bits in an opcode. This reduction has many benefits including reduced code memory requirements, smaller opcode bus size, reduced power, a less complex thread select block 34 and overall reduction in size of a processing unit 14. The nature or gist of the MTMD architecture is to remove all address branching. The IF/ENDIF instructions require no address, while the LOOP and CALL/RET instructions require addresses that need only be known to the execution unit. Since an opcode bus 6 does not have to carry these addresses, the broadcasted opcodes may be very small, preferably on the order of eight bits. A processing unit 14 requires addresses to access local data memory 48, however, the local data memory access may be accommodated by a multiple word opcode (e.g., with additional opcode words, typically two opcode words, supplying the address) or with register indirect addressing.

The arithmetic operations are the actual work being done by the MTMD processor whereby the MTMD architecture supports any arithmetic computation. The operands of the arithmetic instruction may be registers, immediate data (e.g., data contained within the instruction), or memory locations. The arithmetic functions processing an operand may be any mathematical or logical function, including combinations of functions, such as a "multiply-accumulate". A pseudo opcode for this type of operation may be defined as MATH (e.g., representing any mathematical or logical function). Any arithmetic operation may also be implemented as a conditional operation. This type of conditional operation does not include branching, whereby a typical coding example of this type of conditional instruction is shown below:

*IF EQ X=X+1.*

The register X is incremented if the current state of the accumulator flags (e.g., ALU status flags) indicates that the previous operation is equal to zero. A pseudo opcode of this conditional type of instruction may be defined as IF COND MATH.

Memory accesses are supported to and from local data memory 48. The address for the memory accesses may be indirect as referenced by a current value in a register, or immediate as defined in the opcode.

Register move operations include a simple transfer of data from one register to another. These may be conditional opcodes whereby two pseudo opcodes for this type of instruction may include MOVE and IF COND MOVE for the non-conditional and conditional operations, respectively.

Conditional execution is the ability to selectively execute a block of code depending upon a condition at the beginning of the code block. Three opcodes defined to support conditional execution include IF COND, ELSE and ENDIF. It is important to note that these are actual opcodes, and not a high level language that is compiled down to branching conditionals, since the MTMD architecture does not generally support branching conditionals, but rather, enables the execution units to transmit to the processing units each code block instruction, while the processing units selectively execute those instructions, via the enable flag as described above, based on the condition at the beginning of the code block. A processing clock cycle is used for the ELSE opcode, while another clock cycle is used for the ENDIF opcode. A typical coding example utilizing the conditional opcodes is shown below:

MATH
  IF EQ
    MATH
    MATH
  ELSE
    MATH
  ENDIF

Looping is the ability to repeatedly execute the same portion of code. The MTMD architecture supports fixed looping with an immediate operand defining the loop count (e.g., the number of times to loop). The last instruction of the loop is referenced by an offset from the current instruction or as an absolute location in the program code. In the assembly listing (i.e., code) shown below, the last instruction is defined by a label (i.e., LoopEnd):

MATH
    LOOP 30, LoopEnd
      MATH
      MATH
  LoopEnd: MATH
    MATH

The three math operations within the loop of the exemplary code shown above are executed 30 times.

The quantity of iterations a loop performs is often based on the value of a data variable. The MTMD architecture supports this feature with a variable termination condition in addition to a required fixed loop count as described above. A loop is executed for a maximum count as defined by the fixed loop count. The loop may prematurely terminate if the variable decrements to zero before the maximum loop count is expired. The register used for the loop count automatically decrements with each loop iteration. An example of the variable terminated loop is shown below wherein register X is assumed to have a previously set value less than ten:

MATH
    LOOP 10, X, LoopEnd
      MATH
      MATH
  LoopEnd: MATH
  ENDLOOP
  MATH The MTMD architecture requires that the maximum loop count always be present and that an ENDLOOP opcode be placed immediately after the last instruction of the loop. This is similar to the ENDIF opcode required after a conditional block of code. In effect, the termination of a loop is a conditional execution that is based on the loop count contained within the variable.

The conditional terminated loop opcode is similar to the variable terminated loop described above with the exception that a status flag is used to terminate the loop instead of a register decrement. The maximum count for the loop is still required, and the loop only executes a quantity of iterations up to that maximum loop count, even if the terminating condition is never reached. The state of the terminating status flag is examined at the top of the loop, including the first time the loop is entered. An example is shown below:

MATH
    LOOP 30, EQ, LoopEnd
      MATH
      MATH
  LoopEnd: MATH
  ENDLOOP
  MATH As described above, the ENDLOOP opcode is required to terminate the conditional execution of the loop.

A loop break enables premature exit of a loop from within that loop, and causes execution to resume at the instruction immediately following the loop. This feature is accomplished with a LOOP BREAK opcode. If multiple loops are nested, the LOOP BREAK opcode exits the inner most loop, and resumes execution of an immediate outer loop (e.g., unless the LOOP BREAK opcode is executed from the outermost loop whereby the instruction immediately following that outermost loop is executed as described above). An exemplary use of this opcode is shown below:

MATH
   LOOP 30, LoopEnd
      MATH
      IF EQ
         MATH
         LOOP BREAK
      ENDIF
      MATH
LoopEnd: MATH
   ENDLOOP
MATH The LOOP BREAK opcode may also be implemented in a conditional version shown below:
MATH
   LOOP 30, LoopEnd
      MATH
      IF EQ LOOP BREAK
      MATH
LoopEnd: MATH
   ENDLOOP
MATH Since the loop can be conditionally terminated, an ENDLOOP opcode is required.

The MTMD architecture generally implements loop opcodes, such as the loop opcodes described above, by enabling the execution units to repeatedly transmit to the processing units instructions contained within a loop for each loop iteration. In the case of conditional looping (e.g., variable terminated, conditional terminated, conditional LOOP BREAK) the execution units may repeatedly transmit instructions contained within the loop for the maximum amount of loop iterations, while the processing units selectively execute loop iterations, via the enable flag as described above, based on the conditions indicated within the conditional looping instruction (e.g., upon termination of a conditional loop prior to the maximum loop count, instructions contained within remaining loop iterations up to the maximum loop count are replaced with NOP instructions via the enable flag as described above).

The MTMD architecture supports calling and return from subroutines. Conditional calling of subroutines is typically not allowed, but a subroutine call may be placed in a conditional execution block (e.g., IF/ENDIF instruction block). Subroutines may be referenced (e.g., addressed) by an offset from the current instruction (e.g., an offset from the current instruction address) or an absolute location (e.g., an absolute address). The example shown below demonstrates two subroutine calls:
MATH
CALL Sub1
IF EQ
   CALL Sub2
ENDIF
Sub1: MATH
RET
Sub2: MOVE
RET Unconditioned branching is supported by the MTMD architecture, while conditional branching is generally not supported. However, the MTMD architecture supports limited conditional branching implemented by placing the BRANCH opcode within an IF/ENDIF instruction block. The limitation is that the branch opcode and destination label for the branch instruction (e.g., branch destination) must reside within the same hierarchal level within the IF/ENDIF instruction blocks. An example is shown below:

This is valid coding
MATH
IF EQ
   MATH
   BRANCH For1
   MATH
For1: MATH
ENDIF
This is INVALID coding:
MATH
IF EQ
   MATH
   BRANCH For1
   MATH
   MATH
ENDIF
For1: MATH Since the MTMD architecture includes these limitations, branching is not particularly useful, and is generally considered a bad coding technique.

The MTMD processor operates on one or more threads whereby individual processing units 14 may select an available thread to execute by utilizing the THREAD opcode. The THREAD opcode may reside anywhere in the current thread and may select any other thread or re-select the current thread. If the THREAD opcode is placed within a conditional execution block that is not being executed, the THREAD opcode is not executed, thereby enabling a processing unit 14 to individually determine when to change threads.

When the THREAD opcode is executed, the following sequence of events occur:
1) Processing unit (PU) 14 enters a suspended state.
2) All conditional state flags and stacks in processing unit 14 are reset.
3) Processing unit 14 begins receiving the opcode stream from the desired thread.
4) Processing unit 14 detects a SYNC opcode.
5) Processing unit 14 leaves the suspended state.
6) Processing unit 14 begins executing the thread. The THREAD opcode requires a parameter to identify the desired thread. This parameter may be immediate (e.g., contained within the instruction) or contained within a register. The THREAD opcode may also be conditional. Several THREAD opcodes are demonstrated in the example shown below:
MATH
IF COND
THREAD 3
ENDIF
MATH
IF EQ THREAD 2
THREAD X The SYNC opcode is used to identify the top of a thread, and enables an individual processing unit 14 to recognize the top of a thread. Generally, a single SYNC opcode is placed at the beginning of each thread code module. It may be desirable to dispose a SYNC opcode at an intermediate location within the thread if the intermediate location is a valid location to begin execution of the thread. A SYNC opcode may also be placed at an intermediate location within the thread if a programmer desires an execution unit 2 to halt on a reservation at that location within the code as described below.

The RESERVE opcode is used in conjunction with the THREAD opcode. If a processing unit 14 knows that it is switching to a new thread, that processing unit may place a reservation on that thread. This reservation prevents an execution unit 2 associated with the new thread from broadcasting that new thread upon reaching a SYNC opcode. An execution unit 2 continually broadcasts the SYNC opcode until all reservations placed on that execution unit have been removed. The reservations generated by a processing unit 14 are cleared when that processing unit executes a THREAD opcode. Since a reservation delays operation of an execution unit 2, execution of the reservation opcode by a first processing unit 14 may cause another processing unit 14 executing the reserved thread to pause until the first processing unit is ready to execute the reserved thread. The reservation opcode includes a parameter that identifies the thread to be reserved whereby the parameter may be immediate (e.g., contained within the instruction) or contained within a register. An example of the RESERVE opcode is shown below:

MATH
    RESERVE 3
    :
    MATH
    MATH
    THREAD 3

The goal in solving a design problem by implementing the MTMD architecture is to reduce the number of required threads. There always exists some minimum value of processing power or MIPS (e.g., millions of instructions per second) required by an individual processing unit 14 to perform the most intensive phase of the overall algorithm. This minimum MIPS value may be used to select a machine speed wherein the remaining algorithm phases can be grouped such that the processing power or machine speed required to perform any one group does not exceed the selected machine speed.

Algorithm coding in the MTMD architecture is very inefficient. Several processing unit clock cycles typically are unused since all thread code is broadcast whether or not it is executed. For this reason, a machine that is at least fifty percent faster than a stand alone computer is typically required for an MTMD processor to implement the same algorithm that is performed on the stand alone computer, however, the power consumption should only marginally increase since the logic (e.g., processing unit) is idle for a large percentage of the time. Generally, the MTMD processor includes modern complementary metal oxide semiconductor (CMOS) components since these components require virtually no power when they are in an idle state.

When calculating MIPS requirements in the MTMD machine, an instruction count is determined that includes all instructions within an algorithm phase. This means that all the code within the IF and ELSE part of a conditional block must be included within the instruction count. The various phases of the total algorithm are identified, and for each phase, the MIPS requirement must be known and can be calculated directly from the number of opcodes within the phase code (e.g., including multiplying the quantity of instructions within loops by a corresponding loop count). The phases are grouped such that the MIPS requirement for a processing unit 14 is minimized, while the MIPS requirements of any group does not exceed the maximum MIPS capabilities of the processing unit. For example, the groups shown below in Table I include three threads of 35 MIPS (e.g., thread A includes three phases of nine, ten and sixteen MIPS), 35 MIPS (e.g., thread B requires two phases of nine and twenty-six MIPS) and 36 MIPS (e.g., thread C includes single phase of thirty-six MIPS), respectively, and therefore, a 40 MIPS machine is selected.

TABLE I

| Phase | MIPS | Thread |
|---|---|---|
| V8 | 9 | A |
| V32 part 1 | 10 | A |
| V32 part 2 + V42 + V42bis | 16 | A |
| V34 part 2 | 9 | B |
| V34 part 3 | 26 | B |
| V34 part 4 + V42 + V42bis | 36 | C |

In the above example, each processing unit 14 maintains a state variable within its local data memory 48. This variable is used to conditionally execute the required code (or phase) from the thread that the processing unit is receiving. For example, thread A may be coded as:

ThreadATop:
    SYNC
    X=StateVariable—V8_STATE
    IF EQ
       CALL V8
    ENDIF
    X=StateVariable—V32_PART 1_STATE
    IF EQ
       CALL V32_1
    ENDIF
    X=StateVariable—V32_PART2_STATE
    IF EQ
       CALL V32_2
       CALL Controller
    ENDIF
    BRANCH ThreadATop While the V8 phase negotiations are progressing, the V8 phase of the algorithm may determine to switch to one of the V32 or V34 phases. The code within the V8 phase of the algorithm that makes this determination may be in the form of:

V8:
    <other code>
    X=CurrentTime—TimeToGoToV34
    IF EQ
       StateVariable=V34_PART2_STATE
       THREAD B
    ENDIF
    X=CurrentTime—TimeToGoToV32
    IF EQ
       StateVariable=V32_PART1_STATE
    ENDIF
    <other code>
    RET Since the V34 phase of the algorithm is in a different thread than the current thread, a change to Thread B is required. If there is a transition to V32, no thread change is required, but the state change causes a new phase to execute from Thread A. In the example above, assume that the sampled analog data a modem processes is being placed directly into local data memory 48 by a direct memory access (DMA) operation from a serial port. This serial port is connected to a codec or PCM (i.e., Pulse Code Modulation) encoded digital line. The sampled data is arriving at a particular rate, such as 8,000 Hz, 9,600 Hz, or various other rates. There is no synchronization between the arrival of the sampled data and the execution of the threads. In fact, one processing unit 14 may be receiving data at a rate of 9,600 Hz while another processing unit 14 receives data at a rate of 7,200 Hz. All phases of the algorithm are executing in the background. As a thread repeatedly cycles, it determines whether or not the direct memory access (DMA) operation has provided any new data. If no sampled data is available in a processing unit 14 for that cycle of the thread, the processing unit skips execution on that cycle. This is implemented in conditional code in the example shown below:

V8:
X=DmaOperationCount:
IF GT
   DmaOperationCount=DmaOperationCount−1
   <process the new sample>
   <generate an outgoing sample>
ENDIF
RET Each cycle of a thread is only capable of processing one sample. The programmer needs to insure that every thread (e.g., every execution unit) completes a cycle at least as fast as the fastest possible sample rate. This is accomplished by the proper grouping of phases into a thread. For example, if the fastest sample rate is 9,600 Hz and the V8 phase includes 906 instructions, the V8 phase consumes approximately 8.7 MIPS (e.g., 9,600 Hz sample rate multiplied by 906 instructions performed for each sample). Since thread A includes 35 MIPS and executes on a 40 MIPS machine as described in the example above, thread A cycles at a rate of approximately 10971 Hz (e.g., the 9,600 Hz sample rate multiplied by the 40 MIPS machine rate and divided by 35 MIPS within Thread A performed for each sample). This means that about every eighth cycle does not execute since no sample is available.

It will be appreciated that the embodiments described above and illustrated in the drawings represent only a few of the many ways of implementing a multiple thread multiple data predictive coded parallel processing system and method.

The individual processing system or processor components may be implemented by any conventional or other type of components including processors, combinational logic, field programmable gate arrays (FPGA's), application specific integrated circuits (ASIC), memory devices or other circuitry. The individual processor components may further be implemented by circuitry of various logic types, such as CMOS, TTL, ECL, etc. The processor may include any quantity (e.g., at least one) of execution units, processing units, opcode buses and any other processor components described above, while the processing units may select from among and execute any number of threads.

The various memories, caches, buffers, registers or register banks, stacks, flags and other memory devices of the processor may be implemented by any storage devices having any storage capacities, whereby the storage devices may store the data in any manner (e.g., sequentially, LIFO, FIFO, etc.). The opcode buses may be implemented by any conventional or other types of buses or devices for transferring data. The bus interface unit may be implemented by any device capable of interfacing and transferring information between a bus and storage device. The ALU and Next Address Generator may be implemented by any conventional or other type of ALU, Accumulator or circuitry capable of performing mathematical (e.g., including logic) functions. The logic units (e.g., Sequence Control Logic, Enable Logic, etc.) of the processor may be implemented by combinational logic or other circuitry capable of performing the processing as described above. The multiplexers and demultiplexers of the processor may be implemented by any conventional or other type of multiplexer or demultiplexer, or other circuitry capable of placing data on appropriate lines as described above. The various decoders (e.g., Branch Instruction, Instruction, Conditional Instruction, etc.) of the processor may be implemented by any conventional or other types of decoders or any circuitry capable of decoding the various instructions. The direct memory access controller may be implemented by any conventional or other type of memory controller, or circuitry capable of controlling access to a memory.

It is to be understood that variable "N" used herein merely refers to a quantity of objects (e.g., at least one) and does not limit the present invention to having the same quantities of objects for each of the various objects within or utilized by the processor that the variable "N" references. In other words, although objects may be described in terms of the variable "N", that variable may have different values for each of the objects.

The various reservation and quiet signals may be of any level (e.g., high or low), and may be combined in any fashion (e.g., AND, OR, XOR, etc.) to control an execution unit. Further, the enable flag may be of any level to control passing opcodes or NOP instructions based on occurrence of conditions.

The execution units may broadcast or transmit the instruction streams in any fashion, while the processing units may be coupled to the execution units in any corresponding manner to receive the instruction streams. The instruction streams may contain any suitable algorithms and may be implemented in any suitable computer language that may be compiled, assembled, translated, or otherwise processed into signals comprehended by the processing units. Further, the instruction streams may be stored in the code memories and caches in any fashion, and may be retrieved by the execution units in any manner for execution. Moreover, the contents of the caches may be updated via any cache or other algorithm to expedite memory access and instruction stream retrieval.

From the foregoing description, it will be appreciated that the invention makes available a novel multiple thread multiple data predictive coded parallel processing system and method wherein execution units each broadcast a respective instruction stream, while processing units individually select and execute a particular instruction stream broadcasted by the execution units.

Having described preferred embodiments of a new and improved multiple thread multiple data predictive coded parallel processing system and method, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A parallel processing system for processing in parallel individual data streams in accordance with instruction streams, said processing system comprising:
   a plurality of instruction memories to store said instruction streams, wherein each said instruction memory stores a respective instruction stream;
   a plurality of execution units to retrieve said instruction streams from said instruction memories, wherein each said execution unit is associated with one of said instruction memories and retrieves said respective instruction stream from said one associated instruction memory;

a plurality of buses to transfer said retrieved instruction streams from said execution units, wherein each said bus is coupled to and associated with one of said execution units to receive and transfer said retrieved instruction stream from said one associated execution unit; and a plurality of processing units to selectively execute said instruction streams transferred by said buses from said execution units, wherein each said processing unit is coupled to each said bus and selects and executes a particular instruction stream transferred by said buses to process an individual data stream.

2. The system of claim 1 wherein said instruction streams include inline opcodes to facilitate execution of conditional instructions, and each said processing unit includes:

an enable flag to indicate occurrence of conditions specified within a conditional instruction; and conditional means for selectively executing instructions associated with said conditional instruction based on a state of said enable flag.

3. The system of claim 2 wherein said instruction streams include nested conditional instructions, and each said processing unit further includes:

an enable stack to store the states of said enable flag for each nested conditional instruction; and nested conditional means for selectively executing instructions associated with each nested conditional instruction based on a corresponding state of said enable flag stored in said enable stack for that nested conditional instruction.

4. The system of claim 2 wherein said conditional instructions include conditional looping instructions.

5. The system of claim 1 wherein said system further includes:

reservation means for delaying transfer of a particular retrieved instruction stream from an associated execution unit until each said processing unit selecting said particular retrieved instruction stream enters a state to execute that instruction stream.

6. The system of claim 1 further including:

quiet means for disabling transfer of a particular retrieved instruction stream from an associated execution unit in response to no processing units selecting that instruction stream for execution.

7. In a parallel processing system including instruction memories to store instruction streams, execution units to retrieve instruction streams from the instruction memories, processing units to execute the instruction streams and buses to transfer the instruction streams from the execution units to the processing units, a method of processing in parallel individual data streams in accordance with instruction streams comprising the steps of:

(a) storing an instruction stream within each instruction memory;

(b) retrieving the instruction stream from said each instruction memory via respective execution units, wherein each execution unit is associated with one of the instruction memories;

(c) transferring the retrieved instruction streams from the respective execution units to the processing units via corresponding buses, wherein each bus corresponds to one of the execution units; and (d) selecting and executing a particular instruction stream transferred by the buses within said each processing unit.

8. The method of claim 7 wherein said instruction streams include inline opcodes to facilitate execution of conditional instructions, and step (d) further includes:

(d.1) indicating occurrence of conditions specified within a conditional instruction via an enable flag; and (d.2) selectively executing instructions associated with said conditional instruction based on a state of said enable flag.

9. The method of claim 7 wherein said instruction streams include nested conditional instructions, and step (d.1) further includes:

(d.1.1) storing the states of said enable flag for each nested conditional instruction within an enable stack; and step (d.2) further includes:

(d.2.1) selectively executing instructions associated with each nested conditional instruction based on a corresponding state of said enable flag stored in said enable stack for that nested conditional instruction.

10. The method of claim 7 wherein said instruction streams include conditional looping instructions, and step (d) further includes:

(d.1) indicating occurrence of conditions specified within a conditional looping instruction via an enable flag; and (d.2) selectively executing instructions associated with said conditional looping instruction based on a state of said enable flag.

11. The method of claim 7 wherein said method further includes the step of:

(e) delaying transfer of a particular retrieved instruction stream from an associated execution unit until said each processing unit selecting the particular retrieved instruction stream enters a state to execute that instruction stream.

12. The method of claim 7 further including the step of:

(e) disabling transfer of a particular retrieved instruction stream from an associated execution unit in response to no processing units selecting that instruction stream for execution.

* * * * *